(12) United States Patent
Koppuravuri et al.

(10) Patent No.: US 11,409,739 B2
(45) Date of Patent: Aug. 9, 2022

(54) USING MATERIALIZED VIEWS TO RESPOND TO QUERIES

(71) Applicant: TERADATA US, INC., San Diego, CA (US)

(72) Inventors: Manjula Koppuravuri, Secunderabad (IN); Rangavajjula K N Sai Krishna, Andhra Pradesh (IN); Chandrasekhar Tekur, Hyderabad (IN); Michael Warren Watzke, Fitchburg, WI (US)

(73) Assignee: Teradata US, Inc., San Diego, CA (US)

( * ) Notice: Subject to any disclaimer, the term of this patent is extended or adjusted under 35 U.S.C. 154(b) by 121 days.

(21) Appl. No.: 16/724,724

(22) Filed: Dec. 23, 2019

(65) Prior Publication Data

US 2021/0089529 A1 Mar. 25, 2021

Related U.S. Application Data

(60) Provisional application No. 62/902,710, filed on Sep. 19, 2019.

(51) Int. Cl.
*G06F 16/2453* (2019.01)
*G06F 16/22* (2019.01)
*G06F 16/23* (2019.01)

(52) U.S. Cl.
CPC .... *G06F 16/24539* (2019.01); *G06F 16/2282* (2019.01); *G06F 16/2393* (2019.01); *G06F 16/24542* (2019.01)

(58) Field of Classification Search
None
See application file for complete search history.

(56) References Cited

U.S. PATENT DOCUMENTS

| 7,440,963 | B1* | 10/2008 | Bello | G06F 16/24539 |
| 2004/0034616 | A1* | 2/2004 | Witkowski | G06F 16/283 |
| 2005/0102326 | A1* | 5/2005 | Peleg | G06F 16/2455 |
| 2007/0198469 | A1* | 8/2007 | Shriraghav | G06F 16/24535 |
| 2007/0214107 | A1* | 9/2007 | Bello | G06F 16/24539 |
| 2014/0280029 | A1* | 9/2014 | Ding | G06F 16/24539 |
| | | | | 707/717 |

OTHER PUBLICATIONS

Wikipedia, Microsoft Azure last edited Nov. 22, 2019 (8 pages).
Wikipedia, Materialized view last edited Sep. 5, 2019 (5 pages).
Wikipedia, Google Storage last edited Nov. 2, 2019 (2 pages).
Wikipedia, Amazon S3 last edited Nov. 26, 2019 (8 pages).

* cited by examiner

*Primary Examiner* — Christopher J Raab
(74) *Attorney, Agent, or Firm* — Trop, Pruner & Hu P.C.

(57) ABSTRACT

In some examples, a database system includes a storage medium to store a materialized view (MV) that includes data satisfying an MV condition. At least one processor is to receive a query including a query condition, determine that the query condition partially matches the MV condition, and access a part of the data in the MV partially satisfy the query.

15 Claims, 4 Drawing Sheets

USING MATERIALIZED VIEWS TO RESPOND TO QUERIES

CROSS REFERENCE TO RELATED APPLICATION

This application claims the benefit of U.S. Provisional Application No. 62/902,710, filed Sep. 19, 2019, which is hereby incorporated by reference in its entirety.

BACKGROUND

A relational database management system (DBMS) stores databases that include collections of logically related data arranged in a predetermined format, such as in tables that contain rows and columns. To access the content of a table in a database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

In other examples, object stores can be used to store objects that are usually larger in size than rows of a table in a relational DBMS. The object stores can be provided in a cloud that is accessible over a network, for example.

BRIEF DESCRIPTION OF THE DRAWINGS

Some implementations of the present disclosure are described with respect to the following figures.

Figure 1:
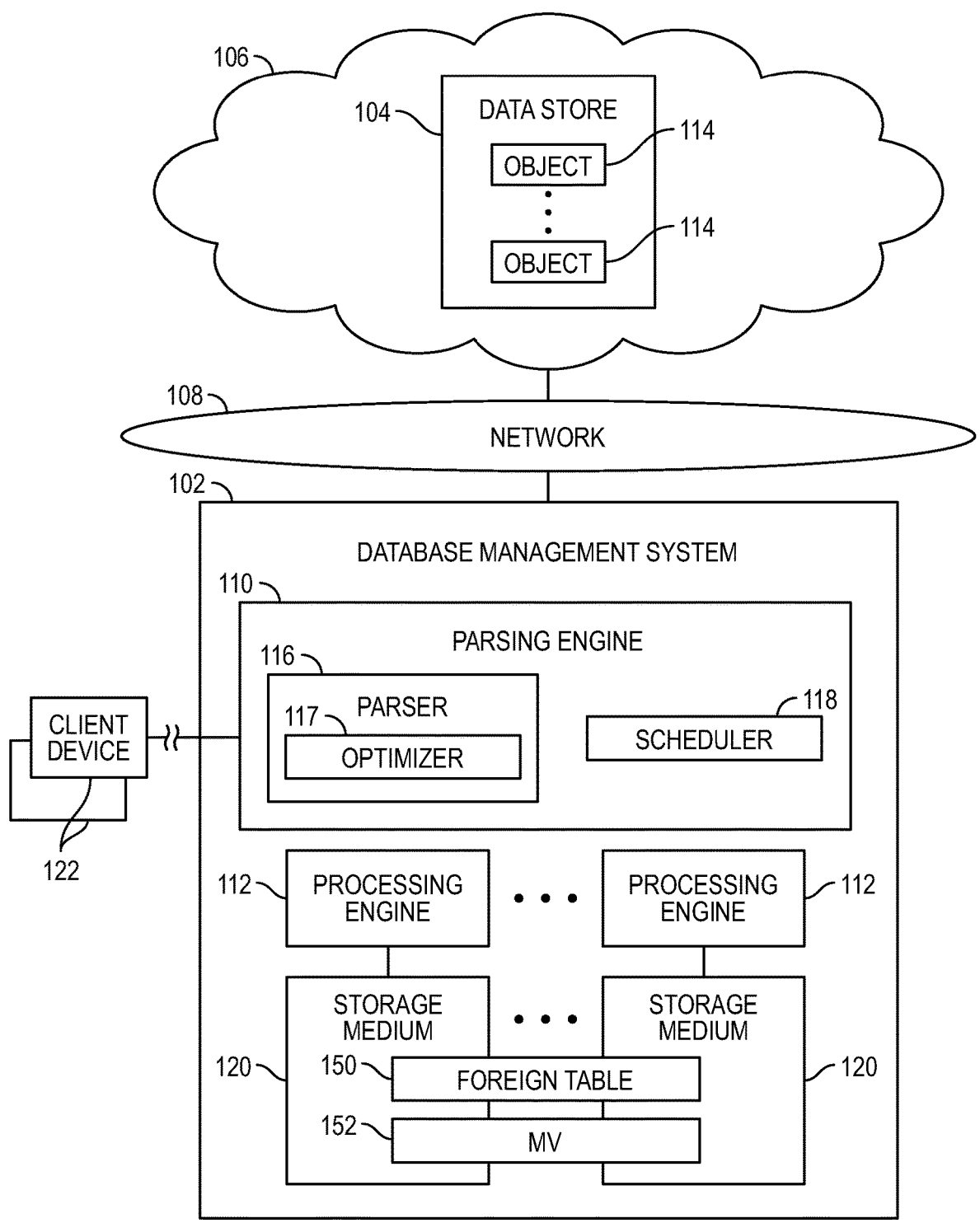
FIG. 1 is a block diagram of an example arrangement that includes a database management system and a remote data store, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

FIG. 1 is a block diagram of an example arrangement that includes a database management system (DBMS) 102 and a remote data store 104. In some examples, the data store 104 is an object store that stores objects 114. As used here, an "object" can refer to any separately identifiable or addressable unit of data.

In some examples, the data store 104 can be accessible in a cloud 106. A "cloud" can refer to any infrastructure, including computing, storage, and communication resources, that can be accessed remotely by user devices over a network, such as a network 108 shown in FIG. 1. Alternatively, the data store 104 can be provided in a data center or in any other computing environment.

The network 108 can include a public network (e.g., the Internet), a local area network (LAN), a wide area network (WAN), a wireless network (e.g., a wireless local area the network or WLAN, a cellular network, etc.), or any other type of network.

The DBMS 102 includes a parsing engine 110 that is able to process SQL queries, including data definition language (DDL) statements and data manipulation language (DML) statements.

In addition to the parsing engine 110, the DBMS 102 includes multiple processing engines 112.

As used here, an "engine" (e.g., the parsing engine 110 or a processing engine 112) can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The multiple processing engines 112 are able to execute in parallel with one another, and are able to access, in parallel, different data portions (e.g., different objects 114, different portions of objects 114) of the data store 104. Each processing engine 112 is considered a Unit Of Parallelism (UOP) that is able to execute in parallel (e.g., concurrently or simultaneously) with one or more other UOPs. Each UOP is able to perform a local relational operation, such as a join operation (e.g., to join data from multiple tables), a data aggregation operation (to aggregate multiple pieces of data into an aggregate value, such as a sum, maximum, minimum, average, median, etc.), an ordered analytic operation, and so forth. An ordered analytic operation refers to an operation that has an order specification (specifying an order based on one or more attributes, e.g., sorting based on the one or more attributes) or an expression that performs some predetermined analysis, such as ranking, computing a moving average within a window size, calculating a cumulative total, calculating a percentile, and so forth.

In other examples, the DBMS 102 can include just one processing engine 112.

Traditionally, a DBMS stores data in relational databases stored in a block-based storage, in which data is stored as blocks that are smaller in size than objects of object stores. For example, a block-based storage can include disk-based storage devices, solid state storage devices, and so forth. The block-based storage can be connected to the DBMS over a relatively high-speed link, such that the DBMS can access (read or write) data in a relational database with relatively low input/output (I/O) latency (i.e., the delay between a time that a request is submitted and a time that the request is satisfied at the storage is relatively low). The block-based storage can be considered a local storage of the DBMS, since the DBMS is able to access the block-based storage with relatively low I/O latency.

In some examples, instead of coupling block-based storage to the DBMS 102, the DBMS 102 can work with just the data store 104, which can be provided in the cloud 106 or another remote computing environment. In such examples, local block-based storage is not used with the DBMS 102 to store relational tables. The objects 114 of the data store 104 can have variable sizes, and each object can have a size between 10 megabytes (MB) and 100 MB. In other examples, an object can have a smaller or larger size. An object in an object store is typically larger in size than data records (e.g., rows, tables, etc.) stored in a local block-based storage.

When responding to a database query, the DBMS 102 can access (write or read) data of the data store 104, rather than data in a relational table (or relational tables) of a local block-based storage. In some examples, accessing data of the data store 104 can have a higher I/O latency than accessing data of a local block-based storage.

The parsing engine 110 of the DBMS 102 can include a parser 116 and a scheduler 118. The parser 116 or scheduler 118 can be part of the hardware processing circuit of the parsing engine 110, or can include machine-readable instructions executable on the parsing engine 110.

The parser 116 receives database queries (such as SQL queries, load requests, etc.) submitted by one or more client devices 122, which may be coupled to the DBMS 102 over an interconnect (e.g., the network 108 or another link). The parser 116 parses each received database query, and generates executable steps for the parsed query. The parser 116 includes an optimizer 117 that generates multiple query plans in response to a query. The optimizer 117 selects the most efficient query plan from among the multiple query plans. Each query plan includes a sequence of executable steps to perform to process the database query. The scheduler 118 sends the executable steps of the selected query plan to respective one or more processing engines 112.

Each processing engine 112 manages access of data records in respective objects 114 in the data store 104. Each processing engine 112 can perform the following tasks: inserts, deletes, or modifies contents of tables or other data records; creates, modifies, or deletes definitions of tables or other data records; retrieves information from definitions and tables or other data records; locks databases and tables or other data records; and so forth.

As used here, a "data record" can refer to any unit of data that can be written into the data store 104. For example, the data record can be in the form of a row of a table, a table, a materialized view, or any other piece of data. Each data record can have multiple attributes. In a table row, the multiple attributes can be the multiple columns of the table row. Each attribute is assigned a value in the corresponding data record.

The DBMS 102 is able to access the remote data store 104 using a foreign table 150. The foreign table 150 stores information identifying the location of the remote data store 104. The foreign table 150 does not include the actual data of each object 114, such that the foreign table 150 is much smaller in size than the collection of the objects 114 in the data store 104.

In an example, a SQL statement to create a foreign table RWebLog is as follows:
   CREATE FOREIGN TABLE RWebLog
   USING
   (LOCATION ('/R/rweb.teradata.com/mybucket/data')
   PATHPATTERN ($Root/$ServerID/$LogDate);
   In the foregoing example SQL statement, LOCATION and PATHPATTERN are table-level properties. The LOCATION property includes the reference '/R/rweb.teradata.com/mybucket/data' that identifies the location of a remote data store.

Although a specific example foreign table with specific properties is provided above, a foreign table may have other properties in other examples.

In the example shown above, the PATHPATTERN property includes a path pattern that is used to filter object names before fetching the actual data from an object. The path pattern can represent a logical directory structure for the objects 114 in the object store 104. For example, consider an object named as "us/1001/12-12-2012"; in this example, $LogDate has a value 12-12-2012, which is the date that the object having the name "us/1001/12-12-2012" was added to the data store 104. $Root can indicate a country name, and $ServerID includes an identifier of a server on which the object is stored.

In examples where there are multiple processing engines 112, the foreign table 150 can be distributed across respective storage media 120 that are associated with the corresponding processing engines 112. Each storage medium 120 is associated with a respective processing engine 112, such that the processing engine 112 is able to manage access of data in the associated storage medium 120. The storage medium 120 can refer to a physical storage device (or group of physical storage devices) or to a logical storage device.

A physical storage device can include any or some combination of the following: a volatile memory device, such as a dynamic random access memory (DRAM) device, a static random access memory (SRAM) device, and so forth; a nonvolatile memory device, such as a flash memory device, or any other type of nonvolatile memory device; a disk-based storage device; a solid state storage device; and so forth.

A logical storage device can include any partition of one or more physical storage devices.

Database queries (e.g., SQL queries) received by the parsing engine 110 can access the foreign table 150 to identify locations of objects 114 in the data store 104.

Certain data of the objects 114 in the data store 104 may be accessed frequently, such as in response to the database queries from the one or more client devices 122. To improve performance, the frequently accessed external data (of the objects 114 and the data store 104) can be cached locally at the DBMS 102 in a materialized view (MV) 152 that is defined on the foreign table 150. The MV 152 can be created by the parsing engine 110 in response to a SQL statement to create the MV.

In examples where there are multiple processing engines 112, the MV 152 can be stored across the multiple storage media 120 associated with the processing engines 112.

The MV 152 can store payload data from objects 114 that satisfy an MV condition. As used here, "payload data" can refer to data contained in the objects 114 that are to be retrieved and/or manipulated (e.g., added, deleted, updated, joined, sorted, merged, etc.) in response to database queries (e.g., SQL queries, load requests, etc.) from one or more client devices 122.

Although just one foreign table 150 and one MV 152 are shown in FIG. 1, it is noted that in other examples, there can be multiple foreign tables and MVs stored in the storage media 120 of the DBMS 102.

An example SQL statement to create an MV is provided below:
   CREATE FOREIGN JOIN INDEX MV1_RWebLog
   AS SELECT Location, CAST(Payload.UserId AS INTEGER) AS UserId, CAST(Payload.productname AS VARCHAR(100)) AS p,
CAST(payload.sessionid AS INTEGER) AS sessionid,
CAST(payload.pagetype AS VARCHAR(50)) AS pagetype,
CAST(payload.productprice AS INTEGER) AS price,
CAST(Payload.clickts AS TIMESTAMP) AS clickts
FROM RWebLog
WHERE $PATH.$LogDate BETWEEN DATE'2018-01-01' AND DATE'2018-06-30'
PRIMARY INDEX(UserId).

In the foregoing example SQL statement, the name of the MV is MV1_RWebLog, which is an MV defined on the foreign table RWebLog in this example. In the above example, the Location attribute is a key of the MV.

The various CAST( ) clauses of the example SQL statement retrieve different payload attributes from the objects 114 of the data store 104 to store as attributes of the MV 152. The PRIMARY INDEX(UserId) clause specifies that the attribute UserId is to be used as the primary index for the MV.

The WHERE clause in the example SQL statement specifies a date range condition of objects 114 to be retrieved into the MV 152. This condition specified in the WHERE clause is also referred to as an MV condition, also termed a "path filtering condition" of the MV 152. Objects retrieved into the MV 152 are those that satisfy the path filtering condition. Note that the path filtering condition is applied on names of the objects 114.

In the above example, the date range specified by the path filtering condition in the WHERE clause is a date range between 2018-01-01 and 2018-06-30. The $LogDate of each object 114 is used to determine whether the object 114 satisfies the path filtering condition. For example, an object can have a name "us/1001/12-12-2012," where the portion "12-12-2012" is the $LogDate of the PATHPATTERN property of the foreign table 150. The $LogDate portion of the object name can be used in determining whether or not the payload of the corresponding object is to be retrieved into the MV 152.

When a database query is received by the parsing engine 110, the parser 116 can determine whether the MV 152 can be used to satisfy the received database query, based on a comparison of the query condition included in the received query and the MV condition for the MV 152.

Traditionally, in determining whether or not an MV can be used for satisfying a received database query, a parser determines if the MV condition completely overlaps with the query condition; in other words, the data coverage of the MV condition is a superset or is the same as the data coverage of the query condition. The "data coverage" of a query condition or an MV condition refers to a set of data records that satisfy the respective query condition or MV condition.

If the MV condition does not completely overlap with the query condition, then the traditional parser would not be able to use the MV, and will retrieve data from the remote data store 104, which can have a relatively high I/O latency. The high I/O latency can cause a delay in providing results for the database query, can lead to increased network traffic over the network 108, and can cause other issues.

In accordance with some implementations of the present disclosure, the optimizer 117 of the parser 116 can make a determination that the MV 152 can be used to satisfy the database query even if the MV condition does not completely overlap with the query condition of the received database query. More generally, the MV 152 is qualified (i.e., the MV 152 can be used to satisfy the database query), if any of the following coverage conditions is met: Condition 1) the data coverage of the query condition is a subset of the MV condition; Condition 2) the MV condition is a subset of the query condition; or Condition 3) the data coverage of the MV condition intersects with the data coverage of the query condition (i.e., the intersection of the data coverage of the MV condition and the data coverage of the query condition is not null).

The following expresses the three possible coverage conditions, specified as Condition 1, Condition 2, and Condition 3, which correspond to the three coverage conditions discussed above:

Condition 1: if covers(Query$_{cond}$, MV$_{cond}$) is true, qualify MV (fully);

Condition 2: else if covers(MV$_{cond}$, Query$_{cond}$) is true, qualify MV (Partially);

Condition 3: else if Intersection(MV$_{cond}$, Query$_{cond}$) is true, qualify MV (Partially).

In the above, Query$_{cond}$ represents the path filtering condition included in the database query, MV$_{cond}$ represents the path filtering condition for the MV 152, and the function covers(A$_{cond}$, B$_{cond}$) makes a determination of whether B$_{cond}$ (one of MV$_{cond}$ and Query$_{cond}$) completely overlaps A$_{cond}$ (one of Query$_{cond}$ and MV$_{cond}$). The function Intersection(MV$_{cond}$, Query$_{cond}$) determines whether the data coverage of the MV condition intersects with the data coverage of the query condition.

For Conditions 2 and 3, the partial data for the received database query that cannot be satisfied from the MV 152 is retrieved from the data store 104. Since the MV 152 can be used to partially satisfy the database query, query performance is improved since not all data for the database query has to be retrieved from the data store 104.

Figure 2:
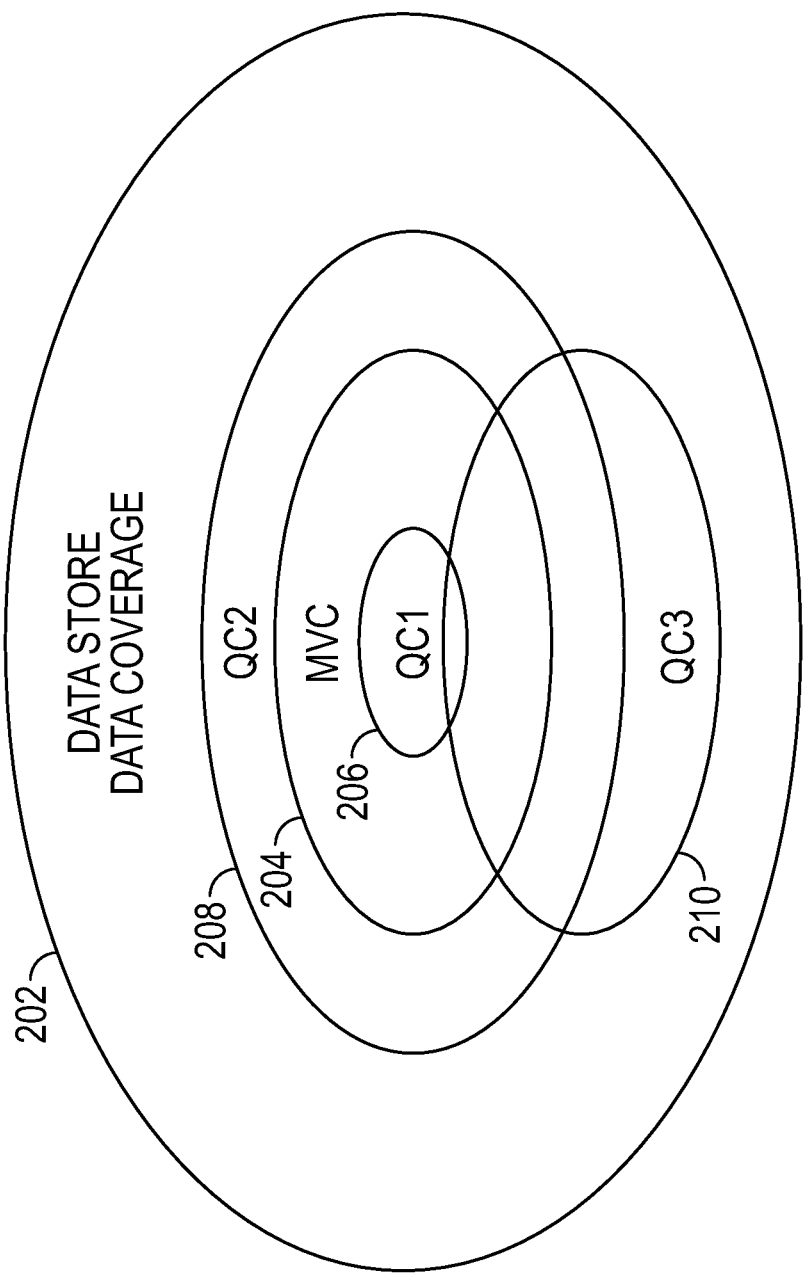
FIG. 2 illustrates different overlaps of query conditions and materialized view (MV) conditions, according to some examples.

FIG. 2 illustrates an example of various data coverages. An data store data coverage 202 represents the entire collection of data records in the data store 104, an MVC data coverage 204 represents a data coverage of the MV condition, a QC1 data coverage 206 represents a data coverage of a first query condition, a QC2 data coverage 208 represents a data coverage of a second query condition, and a QC3 data coverage 210 represents a data coverage of a third query condition.

In the example of FIG. 2, it can be seen that the set of data records that satisfies the MV condition (represented by the MVC data coverage 204) is a subset of the data store data coverage 202.

The MVC data coverage 204 is a superset of the QC1 data coverage 208, which is an example of coverage condition 1 discussed above. The MVC data coverage 204 is a subset of the QC2 data coverage 208, which is an example of coverage condition 2 discussed above.

The QC3 data coverage 210 intersects with the MVC data coverage 204, which is an example of coverage condition 3 discussed above.

In accordance with some implementations of the present disclosure, the optimizer 117 can also check for data freshness, i.e., to ensure that the data in the MV 152 is not stale with respect to the data in the data store 104. Data freshness can be checked based on timestamps (e.g., TIMESTAMPS in the example SQL statement to create the MV above).

If it is determined that data of an object in the MV 152 is stale relative to the object in the data store 104, then the data of the object is not retrieved from the MV 152, but rather the data of the object is retrieved from the data store 104. To check for freshness (or conversely staleness) of data, an execution plan produced by the optimizer 117 retrieves the timestamp of an object from the MV 152, retrieves the timestamp of the object from the data store 104, and compares the timestamps to determine whether or not the object in the MV 152 has become stale (i.e., the timestamp of the object in the MV 152 is earlier than the timestamp of the object in the data store 104).

Figure 3:
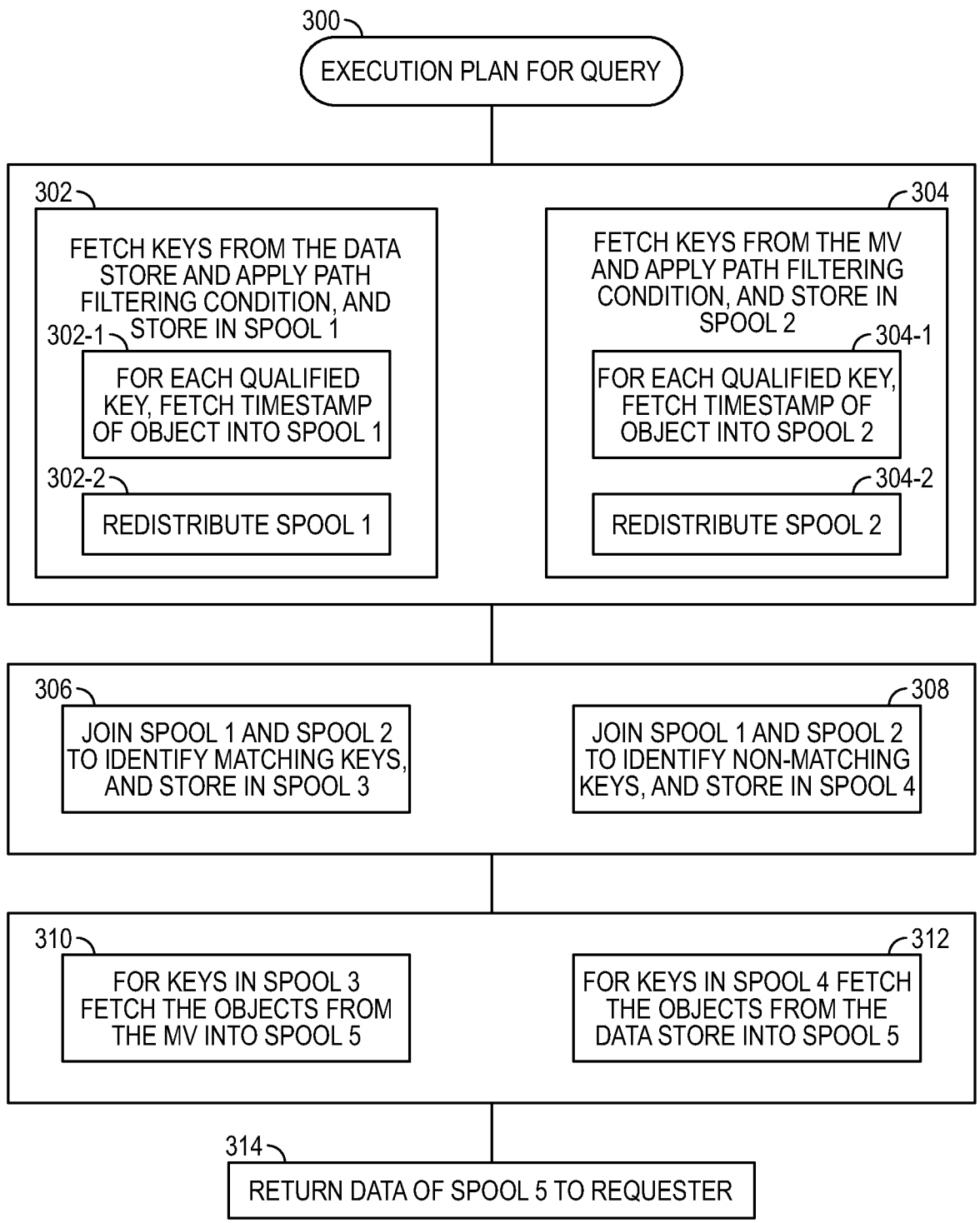
FIG. 3 is a flow diagram of an example process according to some implementations of the present disclosure.

FIG. 3 shows an example execution plan 300 that can be produced by the optimizer 117 for a database query, for coverage condition 2 or 3.

Tasks 302 and 304 can be performed in parallel by the DBMS 102, such as by multiple processing engines 112.

In the ensuing discussion, the term "key" can refer to the name of an object.

Task 302 fetches keys of objects from the data store 104, and applies a path filtering condition of the database query on the keys. The keys that match the path filtering condition are referred to as "qualified keys," and are stored in spool 1. A "spool" can refer to a temporary data storage structure in the DBMS 102.

In task 302, for each qualified key, a task 302-1 retrieves a timestamp for the respective object from the data store 104 (assuming that a stale check is performed), and stores the retrieved timestamp in association with the qualified key. For example, spool 1 can include multiple entries, where each entry includes a qualified key and a corresponding timestamp retrieved from the data store 104.

Note that in the task 302, keys (object names) and possibly timestamps are retrieved from the data store 104. The remaining payload data of the objects is not retrieved. As a result, the I/O latency to retrieve the small subset of information from the data store 104 is relatively low.

In task 302, a task 302-2 redistributes spool 1 across multiple storage media 120 associated with multiple processing engines 112, in examples where there are multiple processing engines 112. For example, the task 302-2 can apply a hash function on each qualified key in spool 1 to produce a respective hash value. The hash values are used to distribute the entries of spool 1 across the multiple storage media 120.

Task 304 fetches keys of objects from the MV 152, and applies the path filtering condition of the database query on the keys from the MV 152. The keys from the MV 152 that match the path filtering condition are referred to as "qualified keys," and are stored in spool 2.

In task 304, for each qualified key, a task 304-1 retrieves a timestamp for the respective object from the MV 152 (assuming that a stale check is performed), and stores the retrieved timestamp from the MV 152 in association with the qualified key. For example, spool 2 can include multiple entries, where each entry includes a qualified key and a corresponding timestamp retrieved from the MV 152.

In task 304, a task 304-2 redistributes spool 2 across multiple storage media 120 associated with multiple processing engines 112, in examples where there are multiple processing engines 112. For example, the task 304-2 can apply a hash function on each qualified key in spool 2 to produce a respective hash value. The hash values are used to distribute the entries of spool 2 across the multiple storage media 120.

Next, tasks 306 and 308 can be performed in parallel in the DBMS 102.

The task 306 joins spool 1 and spool 2 to identify matching keys. As an example, the join performed by the task 306 can be an inclusion merge join. The keys in spool 1 that match the keys in spool 2 are keys of objects in the MV 152 that can be used to satisfy the database query. The matching keys are stored in spool 3.

The task 308 joins spool 1 and spool 2 to identify non-matching keys. As an example, the join of the task 306 can be an exclusion merge join. The keys in spool 1 that do not match the keys in spool 2 are keys of objects that are to be retrieved from the data store 104 to satisfy the database query, since such objects are not found in the MV 152. The non-matching keys are stored in spool 4.

Tasks 310 and 312 can be performed in parallel in the DBMS 102.

For keys in spool 3, the task 310 fetches the objects from the MV 152, and the objects are stored in spool 5. For keys in spool 4, the task 312 fetches the objects from the data store 104, and the objects are also stored in spool 5.

A task 314 returns data of spool 5 to a requester that submitted the database query.

Figure 4:
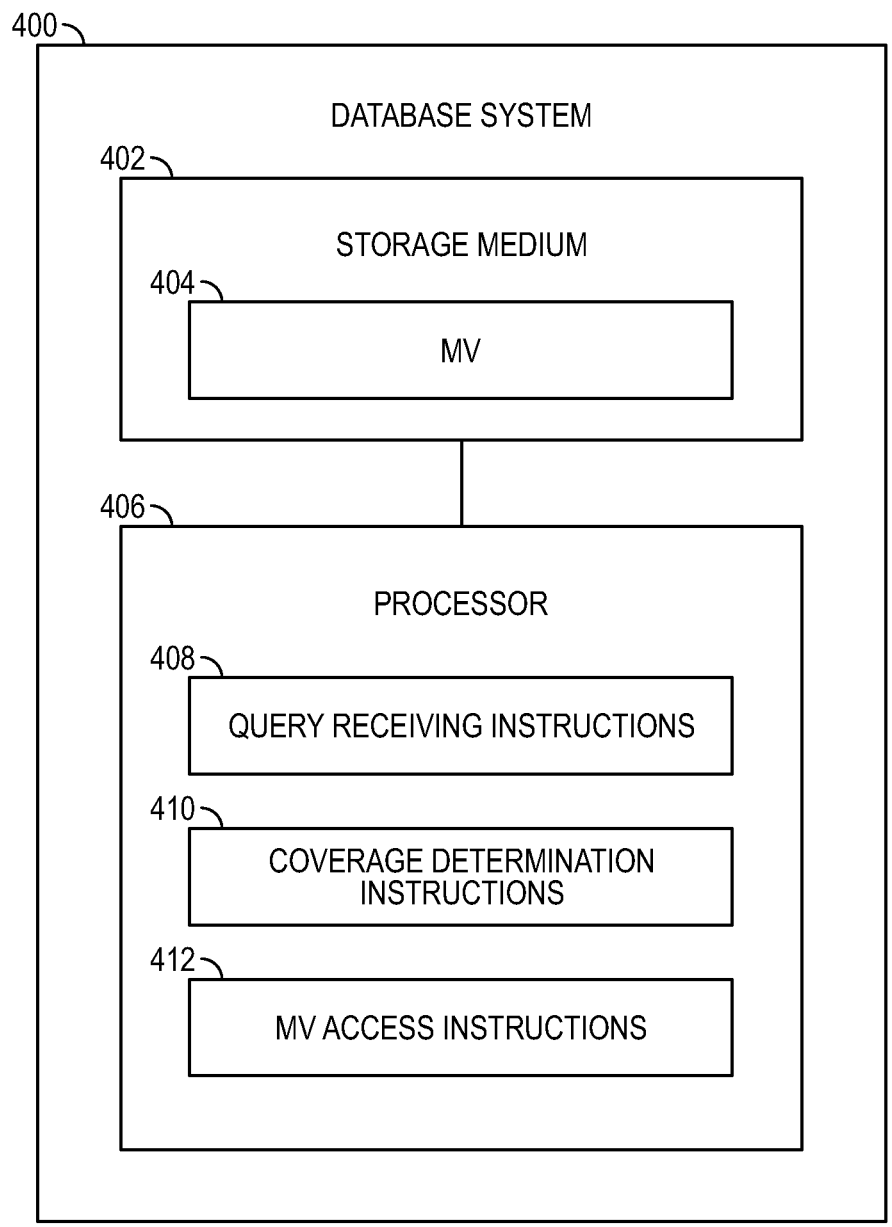
FIG. 4 is a block diagram of an example database system according to some implementations of the present disclosure.

FIG. 4 is a block diagram of a database system 400 according to some examples. The database system 400 includes a storage medium 402 to store a MV 404 that includes data satisfying an MV condition.

The database system 400 further includes one or more hardware processors 406 to execute machine-readable instructions to perform specified tasks. A hardware processor can include a microprocessor, a core of a multi-core microprocessor, a microcontroller, a programmable integrated circuit, a programmable gate array, a digital signal processor, or another hardware processing circuit.

The machine-readable instructions executable by the one or more hardware processors 406 include query receiving instructions 408 to receive a query including a query condition. The machine-readable instructions executable by the one or more hardware processors 406 include coverage determination instructions 410 to determine that the query condition partially matches the MV condition (e.g., condition 2 or 3 above). The machine-readable instructions executable by the one or more hardware processors 406 include MV access instructions 412 to access a part of the data in the MV to partially satisfy the query.

The remaining part of the data for the query can be retrieved from a remote data store (e.g., 104 in FIG. 1).

The machine-readable instructions can be stored in a non-transitory machine-readable or computer-readable storage medium, which can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A database system comprising:
a storage medium to store a materialized view (MV) that includes payload data satisfying an MV condition, the payload data being from first objects in a remote data store coupled over a network to the database system; and
at least one processor to:
receive a query including a query condition;
in response to the query:
identify, from among keys comprising names of the first objects from the MV, first keys from the MV that satisfy the query condition;
retrieve, from the remote data store, keys comprising names of a plurality of objects in the remote data store;
identify, from among the keys retrieved from the remote data store, second keys that satisfy the query condition;
determine that the query condition partially matches the MV condition based on determining which of the first keys from the MV match the second keys from the remote data store;
identify, as part of the determining which of the first keys match the second keys, third keys as a first subset of the second keys that match the first keys, and fourth keys as a second subset of the second keys that do not match the first keys;
access the payload data in the MV to partially satisfy the query, wherein the payload data in the MV that partially satisfy the query are identified by names in the third keys; and
access remaining payload data for the query from the remote data store, the remaining payload data being from objects in the remote data store that are identified by names in the fourth keys.

2. The database system of claim 1, wherein the at least one processor is to, in response to the query, retrieve, from the remote data store, the keys comprising the names of the plurality of objects in the remote data store, without retrieving payload data of the plurality of objects.

3. The database system of claim 1, wherein a name in each key of the first keys and the second keys comprises location information of a respective object.

4. The database system of claim 1, wherein the MV is associated with a timestamp, and the at least one processor is to determine whether the payload data in the MV is stale based on the timestamp.

5. The database system of claim 4, wherein the at least one processor is to:
receive a further query;
responsive to determining that a query condition of the further query at least partially matches the MV condition:
determine whether the payload data in the MV is stale based on the timestamp, and
in response to determining that the payload data in the MV is stale based on the timestamp, retrieve payload data from the remote data store for the further query.

6. The database system of claim 1, wherein a first data coverage of the MV condition is a subset of a second data coverage of the query condition.

7. The database system of claim 1, wherein a first data coverage of the MV condition intersects a second data coverage of the query condition.

8. The database system of claim 1, wherein the storage medium is to store a foreign table comprising information of a location of the remote data store, wherein the foreign table does not store data records of the remote data store, and wherein the MV is defined on the foreign table.

9. The database system of claim 1, wherein the at least one processor is to, in response to the query, retrieve, from the remote data store, the keys comprising the names of the plurality of objects in the remote data store, without retrieving payload data of the plurality of objects, the payload data of the plurality of objects to be joined or merged in response to the query.

10. A non-transitory machine-readable storage medium comprising instructions that upon execution cause a database system to:
store a materialized view (MV) that includes payload data satisfying an MV condition, the payload data being from first objects in a remote data store coupled over a network to the database system;
receive a query including a query condition;
in response to the query:
identify, from among keys comprising names of the first objects from the MV, first keys from the MV that satisfy the query condition;
retrieve, from the remote data store, keys comprising names of a plurality of objects in the remote data store;
identify, from among the keys retrieved from the remote data store, second keys that satisfy the query condition;
determine that the query condition partially matches the MV condition based on determining which of the first keys from the MV match the second keys from the remote data store;
identify, as part of the determining which of the first keys match the second keys, third keys as a first subset of the second keys that match the first keys, and fourth keys as a second subset of the second keys that do not match the first keys;
access the payload data in the MV to partially satisfy the query, wherein the payload data in the MV that partially satisfy the query are identified by names in the third keys; and
access remaining payload data for the query from the remote data store, the remaining payload data being from objects in the remote data store that are identified by names in the fourth keys.

11. The non-transitory machine-readable storage medium of claim 10, wherein the instructions upon execution cause the database system to:
store a foreign table comprising information of a location of the remote data store, wherein the foreign table does not store data records of the remote data store, and wherein the MV is defined on the foreign table.

12. The non-transitory machine-readable storage medium of claim 10, wherein a first data coverage of the MV condition is a subset of a second data coverage of the query condition.

13. The non-transitory machine-readable storage medium of claim 10, wherein a first data coverage of the MV condition intersects a second data coverage of the query condition.

14. The non-transitory machine-readable storage medium of claim 10, wherein the instructions upon execution cause the database system to:
- receive a further query;
- responsive to determining that a query condition of the further query at least partially matches the MV condition:
  - determine whether the payload data in the MV is stale based on a timestamp associated with the MV, and
  - in response to determining that the payload data in the MV is stale based on the timestamp, retrieve payload data from the remote data store for the further query.

15. A method performed by a database system comprising a hardware processor, comprising:
- storing, in a local storage medium of the database system, a materialized view (MV) that includes payload data satisfying an MV condition, the payload data being from first objects in a remote data store coupled over a network to the database system;
- receiving a query including a query condition;
- in response to the query:
  - identifying, from among keys comprising names of the first objects from the MV, first keys from the MV that satisfy the query condition;
  - retrieving, from the remote data store, keys comprising names of a plurality of objects in the remote data store;
  - identifying, from among the keys retrieved from the remote data store, second keys that satisfy the query condition;
  - determining that the query condition partially matches the MV condition based on determining which of the first keys from the MV match the second keys from the remote data store;
  - identifying, as part of the determining which of the first keys match the second keys, third keys as a first subset of the second keys that match the first keys, and fourth keys as a second subset of the second keys that do not match the first keys;
  - accessing the payload data in the MV to partially satisfy the query, wherein the payload data in the MV that partially satisfy the query are identified by names in the third keys; and
  - accessing remaining payload data for the query from the remote data store, the remaining payload data being from objects in the remote data store that are identified by names in the fourth keys.

* * * * *